(12) United States Patent
Blauvelt

(10) Patent No.: US 7,907,649 B2
(45) Date of Patent: Mar. 15, 2011

(54) BIAS SIGNAL GENERATION FOR A LASER TRANSMITTER IN A PASSIVE OPTICAL NETWORK

(75) Inventor: Henry A. Blauvelt, San Marino, CA (US)

(73) Assignee: Emcore Corporation, Albuquerque, NM (US)

( * ) Notice: Subject to any disclaimer, the term of this patent is extended or adjusted under 35 U.S.C. 154(b) by 169 days.

(21) Appl. No.: 12/403,172

(22) Filed: Mar. 12, 2009

(65) Prior Publication Data

US 2010/0232461 A1 Sep. 16, 2010

(51) Int. Cl.
*H01S 3/13* (2006.01)
*H01S 3/00* (2006.01)

(52) U.S. Cl. .............................. 372/29.021; 372/38.08
(58) Field of Classification Search ............. 372/29.021, 372/38.08
See application file for complete search history.

*Primary Examiner* — Armando Rodriguez

(57) ABSTRACT

The teachings presented herein disclose a method and apparatus for controlling the optical power of a laser in a passive optical network transmitter that outputs a modulated optical signal responsive to a modulated input signal. In one or more embodiments, such a control method comprises detecting the voltage of the modulated input signal, and setting the DC bias level of the laser as a function of the detected voltage. These teachings may be implemented, for example, by a laser control circuit in the transceiver module of an optical network unit ("ONU"). Such an ONU may be advantageously used in a hybrid coaxial cable-optical fiber network, such as used in DPONs which interface cable system subscriber equipment to cable system head-end equipment.

15 Claims, 3 Drawing Sheets

BIAS SIGNAL GENERATION FOR A LASER TRANSMITTER IN A PASSIVE OPTICAL NETWORK

RELATED APPLICATIONS

This application is related to co-pending U.S. application Ser. No. 12/190,754, filed on Aug. 13, 2008.

TECHNICAL FIELD

This disclosure relates to passive optical networks laser control in a passive optical network ("PON"), and particularly relates to bias signal generation for a laser transmitter used to output optical signals for transmission in a PON.

DESCRIPTION OF THE RELATED ART

Fiber optic technology has been recognized for its high bandwidth capacity over longer distances, enhanced overall network reliability and service quality. Fiber to the premises ("FTTP"), as opposed to fiber to the node ("FTTN") or fiber to the curb ("FTTC") delivery, enables service providers to deliver substantial bandwidth and a wide range of applications directly to business and residential subscribers. For example, FTTP can accommodate the so-called "triple-play" bundle of services, e.g., high-speed Internet access and networking, multiple telephone lines and high-definition and interactive video applications.

However, utilizing FTTP involves equipping each subscriber premises with the ability to receive optical signals and convert them into electrical signals compatible with pre-existing wiring in the premises (e.g., twisted pair and coaxial). For bi-directional communication with the network, the premises should be equipped with the ability to convert outbound electrical signals into optical signals. In some cases, these abilities are implemented using a passive optical network ("PON").

Generally speaking, a PON is a point-to-multipoint fiber to the premises network architecture in which un-powered optical splitters are used to enable a single optical fiber to serve multiple subscriber premises, e.g., 16 subscribers, 32 subscribers, etc. A PON generally includes an optical line termination ("OLT") at the service provider's central office, and a gateway device at each end user location. For example, the premises equipment at each subscriber location may couple to the PON via an optical network unit ("ONU").

To provide gateway functionality, each ONU includes a "transceiver module." A transceiver module generally includes a laser and associated driver circuitry to convert electrical signals outgoing from the subscriber equipment into optical signals for upstream transmission within the PON. Correspondingly, the transceiver module includes an optical receiver to convert downstream optical signals incoming from the PON into electrical signals for the subscriber equipment. ONU implementation, and particularly, transceiver module implementation, varies with the type of PON.

For example, at least some implementation details differ between baseband digital PONs and so-called "DPONs." In baseband digital PONs, the network sends timing information directly to the circuitry that controls transceiver laser power, allowing the laser to be turned on immediately before data is to be transmitted. However, in a "DPON" transmission, timing information generally is not available from the network for laser control.

In more detail, DPONs take their name from the Data Over Cable Service Interface Specification ("DOCSIS"). This specification defines industry standards for the operation of cable modems and the cable modem termination systems (CMTS) at the network head end. The DOCSIS standards define such things as the format for the modulated digital RF carriers used for communicating between a CMTS and its associated cable modems, the frequencies and RF power levels for transmissions, and the process for requesting and being granted permission to transmit over the cable network.

However, the DOCSIS standards assume that the cable network connections between the CMTS and the cable modems will be by coaxial cable and not optical fiber. Therefore. DOCSIS does not make provisions for providing cable network timing or control information to a DPON being used to interconnect a CMTS with subscriber modems. Indeed, the DPON must operate transparently with respect to the cable system. As such, the OTU at the cable head end and the respective ONUs at the subscriber premises convert the electrical/RF signals going between the CMTS and respective subscriber equipment into optical signals for transport via the DPON, without interfering with normal cable system operation.

Because timing and control signaling from the cable system are not provided to the DPON, certain challenges arise with respect to laser control and operation. For example, the gateway devices coupling subscriber equipment to the PON must autonomously determine when to turn on their lasers for upstream optical transmission. In one approach, a given gateway device turns on its laser power responsive to blindly detecting the presence of a modulated input signal (e.g., an RF signal) originating from its corresponding subscriber equipment.

Another concern not addressed by DOCSIS is the laser DC bias level to be used in the transceiver module at a given subscriber location, for converting upstream electrical/RF signals into optical signals for transmission over the DPON. Ideally, one would set the DC laser bias to a level that maximizes carrier-to-noise and carrier-to-distortion levels in the DPON. Of course, the DC bias level that achieves those goals varies as a function of many design and implementation details, and also as a function of input signal parameters.

In general terms, the laser should be biased to a level that avoids "clipping" in the output optical signal, or other non-linear response. Clipping occurs when the driver circuitry attempts to drive the laser beyond its operating limits. The most common occurrence of this is when the laser current represented by the DC bias plus the modulated signal goes below the laser threshold current.

However, setting the proper DC bias level is further complicated by the fact that amplitudes of the modulated signal input to the transceiver module can vary over time, such as between or within a periodic time slot or interval in which packetized information or data is formatted and transmitted over a communications link (herein after "burst").

For example, the modulated input signal may be a radiofrequency (RF) signal derived from a serial data stream to be transmitted, and may comprise modulated and filtered data bursts containing data at possibly variable symbol rates. Example modulation formats include π/4 DQPSK, QPSK and 16-QAM, using differential or non-differential encoding. An example modulated burst includes a power up, ramp up, preamble, data, forward error correction (FEC), ramp down, guard time and power down in each burst.

The possible use of modulation formats with high peak-to-average ratios (PAR) further complicates the DC bias level control of the laser transmitter. Indeed, the input signal's modulation format may change, depending on data rate, for example, and/or may be unknown to the transceiver module.

Known techniques for laser biasing include constant optical power biasing and envelope-based biasing. With constant optical power biasing, a laser control or driver circuit sets the laser bias to a fixed value for any input RF signal level within the operating range of the transmitter. For input RF signal levels below the operating range, the laser bias is commonly set to a low quiescent level. The circuitry that sets the laser bias commonly utilizes a monitor photodiode packaged together with the laser to determine the bias current required for attaining the desired optical output power.

Another biasing approach responds to the envelope of the modulated input signal rather than to its average amplitude. For example, see U.S. Pat. No. 6,728,277 to Wilson, which is commonly owned with the instant application. In the '277 patent, a laser transmitter uses a dynamic bias signal that is adjusted in response to the detected envelope of the applied RF signal. The '277 patent teaches that dynamic biasing as a function of input signal envelope avoids the clipping problems that might otherwise occur with a fixed biasing, which is another known approach. Envelope biasing also commonly utilizes a monitor photodiode to determine the laser bias required to attain a desired optical output power. "Sagging" is one potentially problematic aspect of envelope based biasing. Sagging arises, for example, when the input signal includes a series of relatively low amplitude symbols. Such a series of low-amplitude symbols will result in a decrease in the laser bias when envelope biasing is utilized. If one or more relatively high amplitude input symbols are next received, the laser bias may be set too low to accommodate these high amplitude symbols and clipping may occur for a period of time until the envelope biasing circuitry increases the laser bias in response to the higher amplitude RF input.

The extent to which a RF signal has been distorted or combined with noise is characterized by persons skilled in the art by known figure of merit (measurements or calculations) referred to as Noise Power Ratio (NPR). Other figures of merit may be, for example, noise (from the laser, the optical link, the receiver) and intermodulation products. The present invention is not limited to optimizing any one figure of merit.

Digital signals (RF input) transmitted out at amplitudes having an NPR equal to or greater than a predetermined minimum NPR (e.g. the current industry standard minimum NPR is approximately 30 dB) are considered to have acceptable fidelity, while signals (RF input) transmitted out at amplitudes having an NPR less than the predetermined minimum NPR (e.g., 30 dB) are deemed unacceptably distorted and/or noisy, as the case may be. Of course, specific applications or customer required specifications may set the NPR at different minimum levels.

In a typical digital signal transmission system of the related art, the NPR associated with digital signals (RF output) passing out of the PON may be characterized as a function of the amplitude (i.e. signal strength measured in dBmV) of the inputted signals (RF input). Digital signals (RF input) that have insufficient amplitude (i.e. having amplitude smaller than the smallest amplitude that will emerge from the PON with an NPR equal to or greater than the predetermined minimum NPR) will emerge too noisy (i.e. with a NPR less than 30). Digital signals (RF input) that have a large amplitude can be clipped to an extent roughly proportional to their amplitude, thus introducing noise and/or distortion. Thus, digital signals (RF input) that have an amplitude greater than a maximum amplitude (that depends on system device characteristics), can emerge too distorted (i.e. a NPR that is less than 30). The range of signal amplitudes that includes amplitudes that are not too small, nor too large, and that will emerge from the system with an NPR equal to or higher than the predetermined minimum NPR, is referred to as the "dynamic range."

A digital signal transmission system having maximally wide dynamic range, and particularly a system that does not introduce significant gain nor attenuation to power level of the outputted RF signal (RF output) relative to the input (RF input), is desirable. However, conventional techniques for increasing the dynamic range of such a system, generally entail providing more-expensive system components (e.g. a higher fidelity transmitter Tx and/or receiver Rx) and/or higher quality (i.e. more expensive) optical LINK media etc.

There is thus a need for a method for transmitting RF signals through an optical link, and an economical RF digital signal transmission system, that provide an enhanced (i.e. wider) effective dynamic range.

SUMMARY OF THE INVENTION

The teachings presented herein disclose a method and apparatus for controlling the optical power of a laser in a passive optical network transmitter that outputs a modulated optical signal responsive to a modulated input signal. In one or more embodiments, such a control method foresees that RF input signals will produce output signals (RFout) having NPR that is needed for faithful transmission of encoded information.

In at least one such embodiment, the modulated input signal includes periodic or time slotted sequences of data lasting a few milliseconds, which may be referred to hereinafter as "bursts".

With the above examples in mind, one or more embodiments taught herein provide a laser control circuit for controlling the optical power of a laser in a passive optical network transmitter that outputs a modulated optical signal responsive to a modulated input signal. The laser control circuit comprises a circuit configured to detect the voltage of the modulated input signal, and a bias control circuit configured to set the DC bias level of the laser as a function of the detected voltage.

In one or more embodiments the laser control circuit performs voltage detection and corresponding DC bias level adjustment on a per modulation burst basis. For example, the DC bias level for the laser in each modulation burst is set based on the voltage detected for that burst.

In one or more embodiments, the laser control circuit is included in an Optical Network Unit (ONU) for use in a PON that provides a hybrid coaxial cable-optical fiber network that interfaces cable system subscriber equipment with cable system head-end equipment. In such embodiments, the modulated input signal comprises an electrical signal in the radiofrequency (RF) range.

Non-limiting details for one or more such implementations are set forth in the accompanying drawings and the description below. Other features and advantages will be apparent to those skilled in the art from the description and drawings, and from the claims.

DESCRIPTION OF VARIOUS EMBODIMENTS

Figure 1:
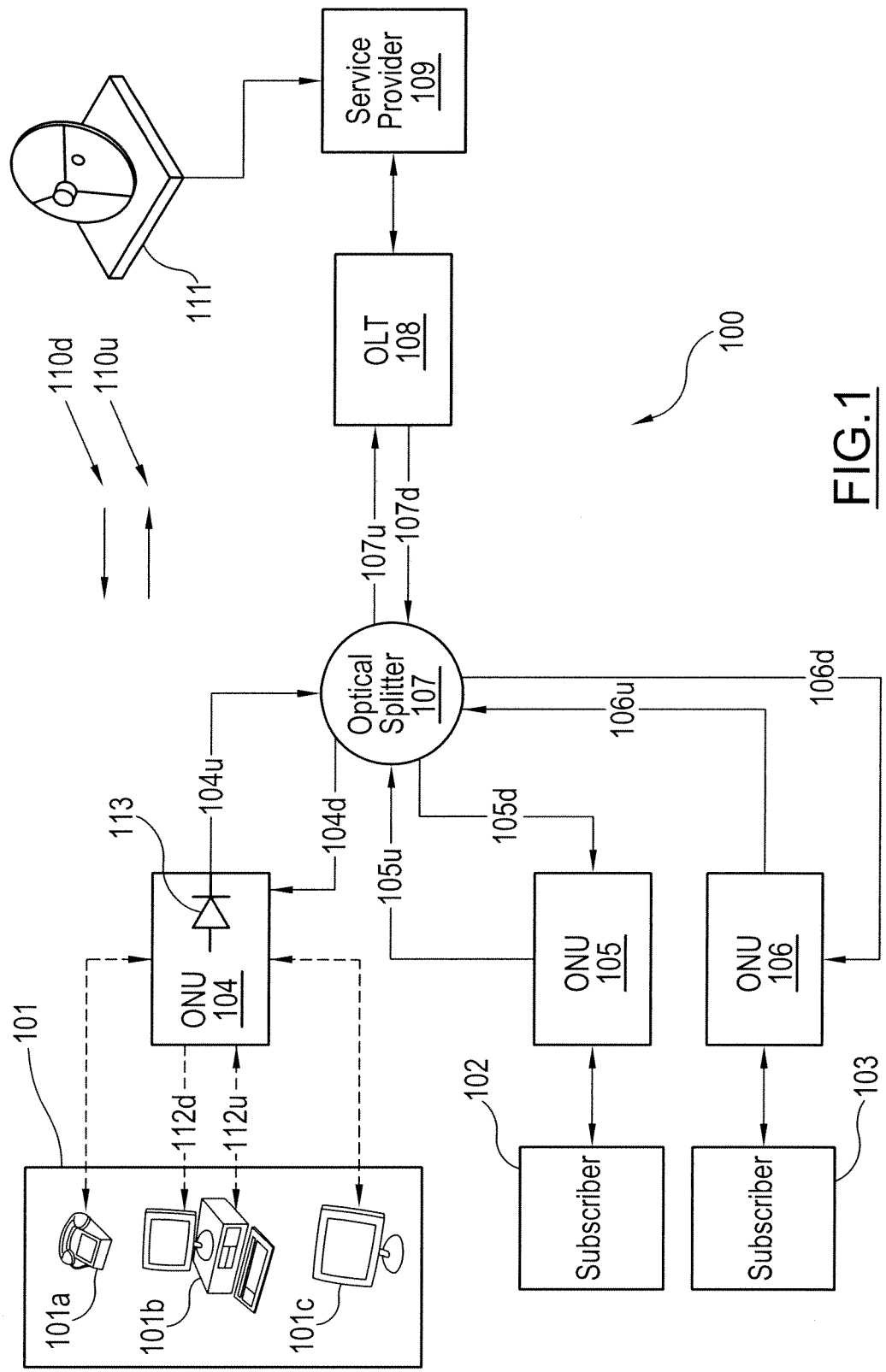
FIG. 1 is a block diagram illustrating an implementation of a PON network architecture that includes one or more transceivers configured for peak-based laser biasing as disclosed herein.

The following is a disclosure of various implementations of controlling the power of a laser used in an optical transmitter configured for use in passive optical networks ("PONs"). By way of non-limiting example. FIG. 1 illustrates an implementation of a network topology associated with a PON 100. The PON 100 comprises, in one or more embodiments, a "DPON" that is configured for operation within a cable system according to the Data Over Cable Service Interface Specification ("DOCSIS").

With reference to the illustration, data transmission in the direction of arrow 110*d* will be referred to as "downstream" and data transmission in the direction of arrow 110*u* will be referred to as "upstream." Solid lines represent data exchange via an optical link (e.g., one or more fiber optic cables or fibers) and dotted lines represent data exchange via a non-optical link (e.g., one or more copper or other electrically conductive cables). Data transmission via optical links can be bi-directional, even over single fibers. Accordingly, in some implementations, subscribers (e.g., 101-103) receive and transmit data over a single fiber optic cable.

Service provider 109 provides one or more data services to a group of subscribers (e.g., 101-103). In some cases, the data services include, for example, television, telephone (e.g., Voice over IP or "VoIP") and internet connectivity. In some implementations, television services are interactive to accommodate features such as "on-demand" viewing of content. The service provider 109 may generate some or all of the content that the subscribers receive, or it may receive some or all of the content from third parties via a data link. For example, the service provider 109 can be coupled to the PSTN for telephone service, e.g., via E1 or T1 connection(s). The service provider 109 can receive certain television content via head end 111, which also includes a CMTS for internet/data connectivity. Television content can include additional data that is generated or provided by the service provider 109, e.g., data regarding programming schedules.

The service provider 109, as part of providing data services to a group of subscribers, can be adapted to receive data from those subscribers. For television services, the service provider 109 receives data from subscribers indicative of, e.g., purchases and/or selection of "on-demand" type material or changes to subscription parameters (e.g., adding or deleting certain services). For telephone and Internet services, the service provider 109 receives data originating from subscribers, thereby enabling bi-directional communication.

The service provider 109 is adapted to provide the data services content (e.g., bi-directional telephone, television and internet content) via a non-optical link to an optical line termination unit ("OLT") 108. The link between OLT 108 and service provider 109 can include one or more copper or other electrically conductive cables. The OLT 108 is adapted to receive data from the service provider 109 in one format (e.g., electrical) and convert the data to an optical format. The OLT 108 is further adapted to receive data from subscribers (e.g., 101-103) in an optical format and convert it to another format (e.g., electrical) for transmission to the service provider 109. In this implementation, the OLT 108 may be analogized to an electro-optical transceiver that: (1) receives upstream data in an optical format from subscribers (e.g., 107*u*); (2) transmits downstream data in an optical format to subscribers (e.g., 107*d*); (3) transmits the upstream data in electrical format to the service provider 109; and, (4) receives the downstream data from the service provider in an electrical format.

To transmit the various data from the service provider 109 (e.g., telephone, television and internet) on as few optical fibers as possible, the OLT 108 performs multiplexing. In some implementations, the OLT 108 generates two or more optical signals representative of the data from the service provider 109. Each signal has a different wavelength (e.g., 1490 nm for continuous downstream data and 1550 nm for continuous downstream video) and is transmitted along a single fiber. This technique is sometimes referred to as "wavelength division multiplexing."

Also, as certain data from the service provider 109 may be destined for only a particular subscriber (e.g., downstream voice data for a particular subscriber's telephone call, the downstream data for a particular subscriber's internet connection or the particular "on demand" video content requested by a particular subscriber), some implementations of the OLT 108 employ time division multiplexing ("TDM"). TDM allows the service provider 109 to target content delivery to a particular subscriber (e.g., to one or all of 101-103).

The OLT 108 is coupled to an optical splitter 107 via an optical link. The link can include a single optical fiber through which the OLT 108 transmits and receives optical signals (e.g., 107*d* and 107*u*, respectively). The optical splitter 107 splits the incoming optical signal (107*d*) from the OLT 108 into multiple, substantially identical copies of the original incoming optical signal (e.g., 104*d*, 105*d*, 106*d*). Depending on the implementation, each optical splitter 107 splits the incoming optical signal into sixteen or more (e.g., 32 or 64) substantially identical copies. In an implementation that splits the incoming optical signal into sixteen substantially identical copies, there are a maximum of sixteen subscribers. Generally speaking, the number of subscribers associated with a given optical splitter is equal to or less than the number of substantially identical copies of the incoming optical signal.

In a PON implementation, the splitting is done in a passive manner (i.e., no active electronics are associated with the optical splitter 107). Each of the signals from the optical splitter 107 (e.g., 104*d*, 105*d*, 106*d*) is sent to a subscriber (e.g., 101-103, respectively) via an optical link. Also, the optical splitter 107 receives data from subscribers via optical links. The optical splitter 107 combines (e.g., multiplexes) the optical signals (104*u*, 105*u*, 106*u*) from the multiple optical links into a single upstream optical signal (107*u*) that is transmitted to the OLT 108.

In some implementations, each subscriber is equipped with an ONU that employs time division multiple access (TDMA). This allows the service provider 109, with appropriate de-multiplexing, to identify the subscriber from whom each packet of data originated. Further, in some implementations, upstream and downstream data between a subscriber (e.g., one of 101-103) and the optical splitter 107 is transmitted bi-directionally over a single fiber optic cable.

The optical splitter 107 typically is disposed in a location remote from the service provider. For example, in a PON implemented for subscribers in a residential area, a given neighborhood will have an associated optical splitter 107 that is coupled, via the OLT 108, to the service provider 109. In a given PON, there can be many optical splitters 107, each coupled to an OLT 108 via an optical link. Multiple optical splitters 107 can be coupled to a single OLT 108. Some implementations employ more than one OLT and/or service provider.

The optical splitter 107 provides the substantially identical downstream signals (104d, 105d, 106d) to optical network units (104, 105, 106, respectively) associated with subscribers (101, 102, 103, respectively). In some implementations, each respective PON module is disposed in the vicinity of the subscriber's location. For example, an ONU may be disposed outside a subscriber's home (e.g., near other utility connections). In the context of the network architecture, each ONU operates in a substantially identical fashion. Accordingly, only the functionality of ONU 104 will be discussed in detail.

ONU 104 receives the downstream signal 104d and demultiplexes the signal into its constituent optical signals. These constituent optical signals are converted to corresponding electrical signals (according to a protocol) and transmitted via electrical links to the appropriate hardware. In some implementations, electrical signals are generated that correspond to telephone (VoIP), data/internet and television service. For example, electrical signals corresponding to telephone service are coupled to traditional telephone wiring at the subscriber's location, which ultimately connects with the subscriber's phone 101a. Television signals (e.g., for a cable-compatible television 101c) are converted to appropriate RF signals and transmitted on coaxial cable installed at a subscriber's location. Data/internet services (e.g., for a personal computer (PC) 101b and associated cable modem) also may be provided via coaxial cable. Downstream data signal 112d comprises data transmitted to PC 101b. Upstream data signal 112u comprises an RF signal transmitted by PC 101b.

As telephone, internet/data and television services all can be bidirectional, the ONU receives electrical signals that correspond to data originating from the subscriber location (e.g., upstream data signal 112u). This upstream data is converted to an optical signal 104u by the laser 113 (which can be part of the transceiver module within the ONU 104) and transmitted to the optical splitter 107. The optical splitter 107 combines optical signal 104u with the optical signals from other ONUs (e.g., 105u and 106u) for transmission to the OLT 108 (as signal 107u).

Thus, as was previously noted, it will be understood that PON 100 is a DPON in one or more embodiments. In DPON embodiments, the PON 100 interfaces a number of cable modems or other subscriber equipment to cable head end equipment, e.g., a CMTS. In such implementations, downstream electrical signals are transmitted from the CMTS and targeted to one or more subscribers. The OLT 108 converts these downstream signals into optical signals for transmission over the PON 100 to the subscriber(s). Correspondingly, ONUs at the subscriber locations convert the downstream optical signals back into electrical signals for coupling into subscriber equipment. In complementary fashion, the ONU at a given subscriber location converts upstream electrical signals into optical signals for transmission over the PON 100, The OLT 108 converts these upstream optical signals back into electrical signals for coupling into the CMTS.

Figure 2:
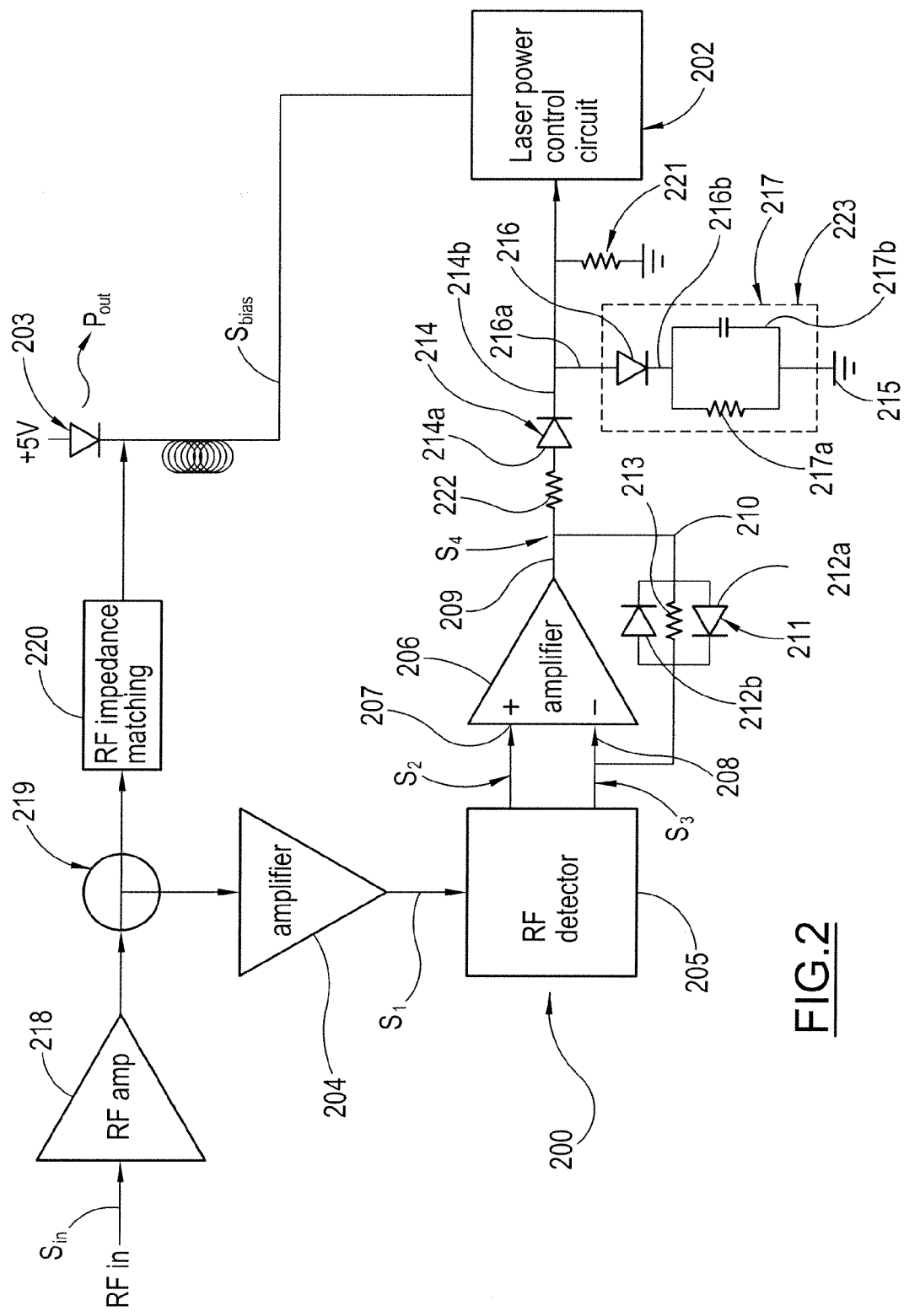
FIG. 2 is a block diagram of one embodiment of a laser control circuit configured to detect the amplitude of an input RF signal for modulating a laser, and to correspondingly set the DC bias level of the laser as a function of the detected signal amplitude over time.

An aspect of such operation that is of interest herein relates to transceiver module laser power control, e.g., controlling the optical output power of the optical transmission laser within the ONU 104. As such, FIG. 2 illustrates a laser control circuit 200 for controlling the power of the laser 203 by setting the DC bias level Sbias of the laser 203. Here, the laser 203 is used in the illustrated PON to convert a modulated input signal, e.g. an RF input signal Sin originating at a subscriber location, into a corresponding optical signal Pout for transmission in the passive optical network 100. The laser control circuit 200 is implemented, for example, in each one or more of the ONUs illustrated in FIG. 1.

Those skilled in the art will appreciate that the optical output power Pout of the laser 203, which may be implemented as a semiconductor laser diode, is a non-linear function of the laser diode's drive current. That drive current includes two components: the modulated input signal e.g., the RF input signal Sin originating from a cable subscriber's equipment, and the DC bias current Sbias provided by a voltage-mode or current-mode DC bias laser power control circuit 202 of the laser 203. The DC bias level Sbias may be understood as establishing the laser diode's operating point. This operating point resides within the drive current range where the laser diode 203 is in lasing mode operation. Generally, the operating point should be set so that the drive current of the laser 203 during modulation by the modulated input signal remains above its threshold current for lasing mode operation and below any excess drive current levels.

According to one embodiment, the laser control circuit 200 comprises a circuit configured to detect the voltage of the modulated input signal Sin and a bias control circuit configured to set the DC bias level Sbias of the laser 203 as a function of the detected peak amplitude.

According to one embodiment, the circuit comprises a first amplifier 204 to amplify the modulated input signal Sin and generate a first amplified input signal S1, a detector 205 coupled to the first amplifier 204 to receive the first amplified input signal S1 and generate a detected output signal S2 and a reference output signal S3 and a second amplifier 206.

The RF detector 205 is configured to increase the output voltage S2 as the RF power of first amplified input signal S1 increases, whereas the reference output signal S3 is maintained constant. In particular, the reference output signal S3 is settled at a threshold value configured to turn the laser 203 on. In fact, one aspect of the embodiment is to characterize the performance of the laser 203 1n order to determine the optical power level that on average maximizes NPR for every RF input power over the operating RF power range.

According to one embodiment, the detector 205 comprises Schottky diodes and the second amplifier 206 is a fast operational amplifier.

The second amplifier 206 comprises a positive terminal 207 to receive the detected output signal S2, a negative terminal 208 to receive the reference output signal S3, an output terminal 209 to output a second amplified signal S4, a feedback line 210 coupling the negative terminal 208 to the output terminal 209 and a diode clamping circuit 211 provided in the feedback line 210 to prevent saturation of the second amplifier 206.

According to one embodiment, the diode clamping circuit 211 comprises two anti-parallel diodes 212a, 201b coupled to the negative terminal 208 and the output terminal 209 of the second amplifier 206 and a parallel resistance 213.

The circuit further comprises: a level shift diode 214 having a first terminal 214a coupled to the output terminal 209 of the second amplifier 206 and a second terminal 214b coupled to the bias control circuit 202 and configured to shift level of the second amplified signal S4.

It is to be noted that between the output terminal 209 and the first terminal 214a is disposed a first resistance 222.

The circuit further comprises a ground line 215 and a variable clamping circuit 223 coupling the second terminal 214b of the level shift diode 214 to the ground line 215.

According to one embodiment, the variable clamping circuit 215 comprises a clamping diode 216 having a first terminal 216a coupled to the second terminal 214b of the level shift diode 214 and a second terminal 216b, and an RC circuit 217, with a resistance 217a and a capacitor 217b, coupling the second terminal 216b of the clamping diode 216 to the ground line 215.

It is to be noted that between the second terminal 214b and the ground line 215 is disposed a second resistance 221.

Preferably the value of the first and second resistance 221, 222 are different, being the value first resistance 222 lower than the value of the second resistance 221.

Furthermore, the laser control circuit 200 comprises a pre-amplifier 218 to amplify the modulated input signal Sin to generate a pre-amplified modulated input signal Sin and tap 219 to divert the pre-amplified modulated input signal Sin to the first amplifier 204 and to a RF impedance matching circuit 220. The impedance matching circuit 220 is coupled to the laser 203 to modulate the optical output power Pout of the laser 203.

Once the amplifier 204 has amplified the RF signal Sin in order to output the first amplified signal S1, the detector 205 is configured to increase the output voltage S2 as the RF power of first amplified input signal S1 increases, whereas the reference output signal S3 is maintained constant.

Therefore, when the RF power of first amplified input signal S1 is below the threshold level, the output voltage S2 is below the reference value of the output signal S3 and the second amplifier 206 will go to a low output level. In this case the output 209 of the second amplifier 206 is low and the diode level shift 214 is turned off.

When the RF power of first amplified input signal S1 exceeds the reference value of the output signal S3, the output voltage S2 of the RF detector 205 output is above the reference voltage and the second amplifier 206 will go to a high output level. In particular, when the output 209 of the second amplifier 206 increases the laser 203 can be turned on.

However in the case of:

a) the output 209 of the second amplifier 206 is lower than the turn on voltage of diode level shift 214, no current flows through such a diode 214 and the voltage at the output (214b) of the diode 214 is equal to 0V and therefore the laser 203 is still turned off;

b) the output 209 of the second amplifier 206 is greater than turn on voltage of the diode 214 but less than the sum of the turn-on voltages of such a diode 214 and of the clamping diode 216, it results that the voltage at the output 214b of the diode 214 is the voltage at the output 209 of the second amplifier 206 minus the turn-on voltage of diode 214. In this scenario no current is flowing through the clamping diode 216.

Therefore, only when the output 209 of the second amplifier 206 ramps up, the voltage at the output 214b of the diode 214 follows the voltage of the output 209 of the amplifier 206 with a minimal delay but shifted down by the turn-on voltage of 214. The time constant for the rise time of the voltage output 209 up to the point that this voltage equals the sum of the turn-on voltages of diode 214 and clamping diode 216 is determined by the rise time of the RF detector 205 and the amplifier 206, and more specifically by the resistor and capacitor values internal to these two circuit elements. By choosing the appropriate internal resistor and capacitor values, the initial rise time can be set to any desired value. When the voltage output 209 is greater than the sum of the turn-on voltages of diode 214 and clamping diode 216, it results that current is now flowing through such a clamping diode 216 and this starts to charge capacitor 217. The voltage at output 214b of the diode 214 is the turn-on voltage of clamping diode 216 plus the voltage on the capacitor at 217. The time constant for the charging of capacitor at 217 is equal to the RC product of capacitor 217b and a resistance equal to the parallel combination of resistors 217a and 222, thus resulting in a second time constant.

Figure 3:
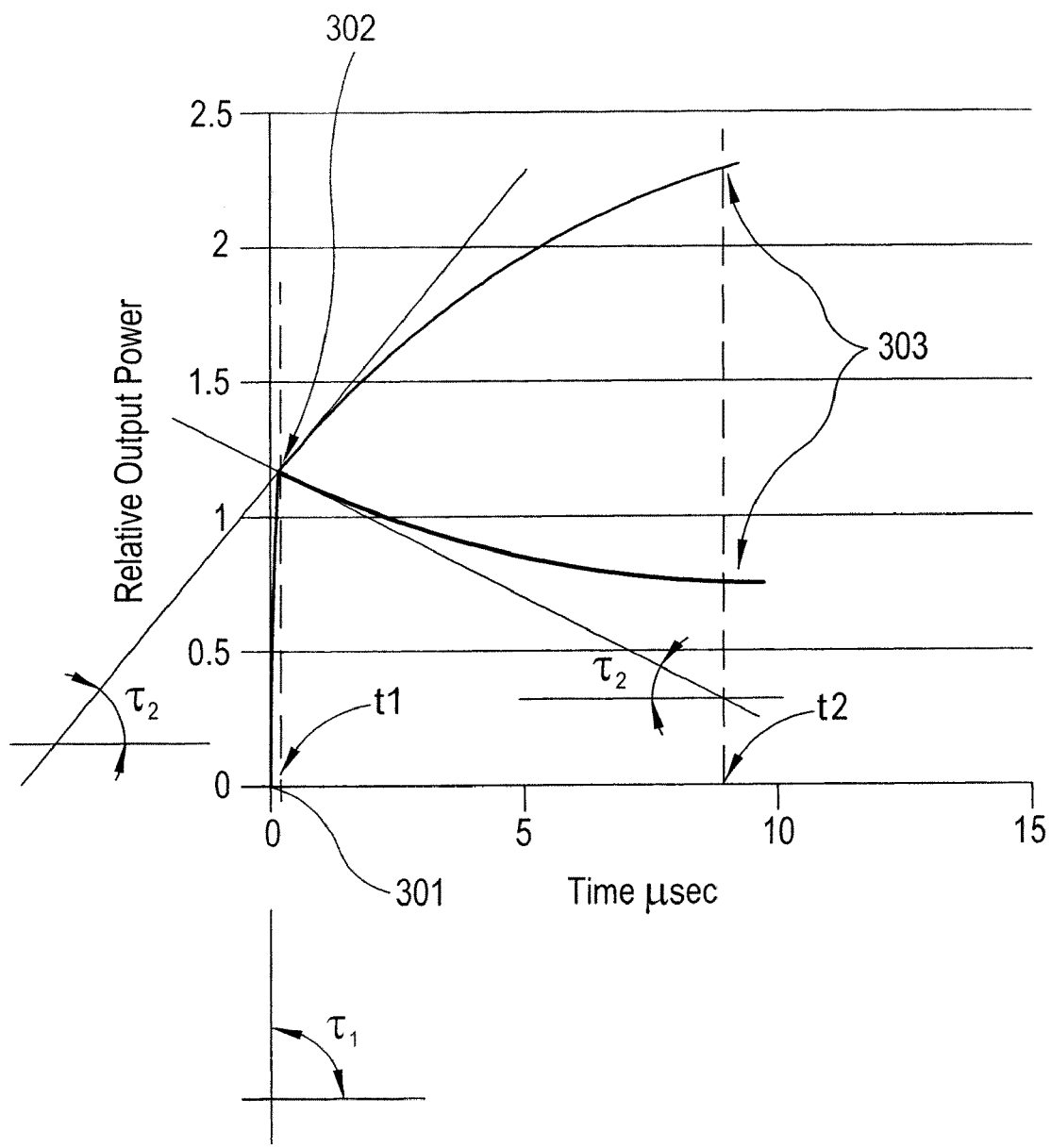
FIG. 3 is a plot of relative laser output power versus time for different voltage conditions of the control circuit of FIG. 2 and resulting in different changes in the DC bias level.

It is to be noted, as depicted in FIG. 3, that when voltage output 209 is greater than the turn-on voltage of diode 214, but less than the sum of the turn-on voltages of diode 214 and clamping diode 216, it results that the laser power control circuit 202 in a first period of time t1, increases with a first time constant T1 the DC bias level from an initial value 301 to a first value 302 configured to set operating point of the laser 203 out of clipping point of the laser. This time constant T1 depends upon the resistors and capacitors within the RF detector 205 and the amplifier 206.

Typically, the first period of time t1 varies in the range of 0.1-1.0 μsec.

Subsequently, during a second period of time t2 subsequent to the first period t1, the laser power control circuit 202 adjusts with a second time constant T2 the DC bias level from said first value 302 to a second value 303. If the second value 303 is greater than the first value 302, the circuit of FIG. 2 can be used to implement the time variation of optical power indicated in FIG. 3. In an alternate embodiment, it may be desirable for the second value 303 to be less than the first value 302. As illustrated, this second value 303 depends upon the average power of said RF input signal Sin during a pre-defined time period so as to optimize the figure of merit, i.e. the NPR, of the optical network unit 104 (or 105, 106). The second, slower time constant T2 is triggered once the clamping diode 216 is turned on by the voltage at the output 214b, and is based on the RC product, where C is the capacitance of the capacitor 217 and R is the resistance of the parallel combination of resistors 217a and 222. As the voltage level on the output terminal 209 increases, the diode 214 turns on and the variable clamping circuit 223 with capacitor 217b becomes active, thereby resulting in the second period of time t2 that is longer than the first period of time t1. Typically, the second period of time t2 varies in the range of 3-10 μsec.

In particular the first time constant T1 is lower than said second time constant T2. Preferably, the first time constant T1 is at least one order of magnitude faster than said second time constant T2.

In one embodiment, during the second period of time t2, the said second value 303 is settled to a DC bias level lower than said first value 302 if the power of said RF input signal is lower than a predefined value. The predefined value may be specified by the application or customer requirements.

In one embodiment, during the second period of time t2, the said second value 303 is settled to a DC bias level higher than said first value 302 if the power of said RF input signal is higher than a predefined value. Again, the predefined value may be specified by the application or customer requirements.

In one embodiment, during the second period of time t2, the output optical signal of the laser is not responsive to the RF input signal Sin.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention. The foregoing description is given for clearness of understanding only, and no unnecessary limitations should be understood therefrom, as modifications within the scope of the invention may be apparent to those having ordinary skill in the art. In general, the spirit and scope of the present invention is intended to be limited only by the claims as appended hereto.

The invention claimed is:

1. A method of controlling the optical power of a laser in an optical network unit, used in a passive optical network, that outputs a modulated optical signal responsive to a RF input signal, the method comprising the steps of:
   detecting the voltage of said RF input signal,
   setting the DC bias level of the laser as a function of the detected RF input signal voltage,
   wherein said step of setting the DC bias level comprises:
   in a first period of time, increasing with a first time constant the DC bias level from an initial value to a first value configured to set operating point of the laser out of clipping point of the laser,
   in a subsequent second period of time, adjusting with a second time constant the DC bias level from said first value to a second value depending on the average power of said RF input signal during a predefined time period so as to optimize a figure of merit of said optical network unit.

2. The method of claim 1, wherein, if the power of said RF input signal is lower than a predefined value, than said second value is settled to a DC bias level lower than said first value, said second value being configured to set operating point of the laser out of clipping point of the laser.

3. The method of claim 1, wherein, if the power of said RF input signal is higher than a predefined value, than said second value DC bias level is settled to a DC bias level higher than said first value, said second value being configured to set operating point of the laser out of clipping point of the laser.

4. The method of claim 2, wherein the predefined value is configured to turn on said laser.

5. The method of claim 1, wherein said first time constant is lower than said second time constant.

6. The method of claim 5, wherein said first time constant is at least one order of magnitude faster than said second time constant.

7. The method of claim 1, wherein said figure of merit is noise power ratio.

8. The method of claim 1, wherein, in said second period of time, the output optical signal of the laser is not responsive to the RF input signal.

9. A laser control circuit for controlling the optical power of a laser in an optical transmitter, used in a passive optical network, that outputs a modulated optical signal responsive to a RF input signal, the laser control circuit comprising:
   a circuit configured to detect the voltage of the RF input signal; and
   a bias control circuit configured to set the DC bias level of the laser as a function of the detected voltage,
   wherein said detector circuit comprises:
   a first amplifier to amplify said RF input signal and generate a first amplified RF input signal,
   a detector to receive said first RF amplified input signal and generate a detected output signal and a reference output signal,
   a second amplifier with:
     a positive terminal to receive said detected output signal,
     a negative terminal to receive said reference output signal,
     an output terminal to output a second amplified signal,
     a feedback line coupling said negative terminal to said output terminal,
     a diode clamping circuit provided in said feedback line to prevent saturation of said second amplifier,
   a level shift diode having a first terminal coupled to said output terminal of the second amplifier and a second terminal coupled to said bias control circuit and configured to shift level of said second amplified signal,
   a ground line,
   a variable clamping circuit coupling the second terminal of said level shift diode to said ground line.

10. The laser control circuit of claim 9, wherein said variable clamping circuit comprises:
    a clamping diode having a first terminal coupled to the second terminal of said level shift diode and a second terminal,
    an RC circuit coupling the second terminal of said clamping diode to said ground line.

11. The laser control circuit of claim 9, wherein said detector comprises Schottky diodes.

12. The laser control circuit of claim 9, wherein said second amplifier is a fast operational amplifier.

13. The laser control circuit of claim 9, further comprising a pre-amplifier to amplify the modulated input signal to generate a pre-amplified modulated input signal and a splitter to divert the pre-amplified modulated input signal to the first amplifier and to the laser to modulate the optical output signal of the laser.

14. The laser control circuit of claim 9, further comprising an RF impedance matching circuit coupled to the pre-amplifier to receive the pre-amplified modulated input signal and to the laser to modulate the optical output signal of the laser.

15. The method of claim 3, wherein the predefined value is configured to turn on said laser.

* * * * *